(12) United States Patent
Lepage et al.

(10) Patent No.: US 9,725,188 B2
(45) Date of Patent: Aug. 8, 2017

(54) DISPLAY SYSTEM OF AN AIRCRAFT, ABLE TO DISPLAY A HORIZON LINE ABLE TO BE DEFORMED AND RELATED METHOD

(71) Applicant: DASSAULT AVIATION, Paris (FR)

(72) Inventors: Sébastien Lepage, Courbevoie (FR);
Olivier Baudson, Suresnes (FR);
Arnaud Turpin, Boulogne Billancourt (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/189,923

(22) Filed: Jun. 22, 2016

(65) Prior Publication Data

US 2016/0376027 A1    Dec. 29, 2016

(30) Foreign Application Priority Data

Jun. 24, 2015    (FR) .................... 15 01310

(51) Int. Cl.
| | | |
|---|---|---|
| *B64D 45/08* | (2006.01) | |
| *G01C 23/00* | (2006.01) | |
| *G05D 1/06* | (2006.01) | |
| *B64C 33/02* | (2006.01) | |
| *G02B 27/01* | (2006.01) | |
| *G08G 5/00* | (2006.01) | |
| *G08G 5/02* | (2006.01) | |
| *G09G 3/00* | (2006.01) | |

(52) U.S. Cl.
CPC ............. *B64D 45/08* (2013.01); *B64C 33/02* (2013.01); *G01C 23/005* (2013.01); *G02B 27/0101* (2013.01); *G05D 1/0676* (2013.01); *G08G 5/0086* (2013.01); *G08G 5/025* (2013.01); *G09G 3/002* (2013.01); *G02B 2027/014* (2013.01); *G09G 2380/12* (2013.01)

(58) Field of Classification Search
CPC ............... B64D 45/08; G02B 27/0101; G02B 2027/014; G08G 5/0086; G08G 5/025; B64C 33/02; G05D 1/0676; G01C 23/005; G09G 2380/12; G09G 3/002
See application file for complete search history.

(56) References Cited

U.S. PATENT DOCUMENTS

| | | | | |
|---|---|---|---|---|
| 4,368,517 | A | * | 1/1983 | Lovering ............. G01C 23/005 340/972 |
| 2009/0138142 | A1 | | 5/2009 | Still et al. |
| 2013/0103233 | A1 | | 4/2013 | Bourret et al. |

(Continued)

OTHER PUBLICATIONS

Albright, James, "Heads Up Display—Symbology", Dec. 1, 2013, http://code7700.com/g450_hud_symbology.html.
French Search Report of priority application FR 15 01310.

*Primary Examiner* — Rodney Butler
(74) *Attorney, Agent, or Firm* — Davidson, Davidson & Kappel, LLC (57) ABSTRACT

A display system of an aircraft, able to display a horizon line able to be deformed and related method are provided. The display system includes a display unit; and an assembly for generating a display on the display unit, able to dynamically display, on the display unit, at least one horizon line and a slope scale relative to the horizon line. Upon approaching a landing strip, the display generator is able to create, on the horizon line, a region that is deformed as a function of the topographical slope of the landing strip approached by the aircraft.

17 Claims, 7 Drawing Sheets

(56) References Cited

U.S. PATENT DOCUMENTS

2015/0123821 A1 5/2015 Greene et al.
2015/0348299 A1* 12/2015 Ott ..................... G01C 23/005
　　　　　　　　　　　　　　　　　　　　　345/632

* cited by examiner

DISPLAY SYSTEM OF AN AIRCRAFT, ABLE TO DISPLAY A HORIZON LINE ABLE TO BE DEFORMED AND RELATED METHOD

This claims the benefit of French Patent Application FR 15 01310, filed Jun. 24, 2015 and hereby incorporated by reference herein.

The present invention relates to a display system of an aircraft, comprising:

a display unit;

an assembly for generating a display on the display unit, able to dynamically display, on the display unit, at least one horizon line and a slope scale relative to the horizon line.

Such a system is designed to be installed in the cockpit of an aircraft to be associated with a display unit of the cockpit. The display unit is for example an at least partially transparent display unit, such as a semitransparent screen placed in front of a windshield of the cockpit, a system for projecting images on the windshield of the cockpit, a semitransparent sunshade, a helmet visor, or a semitransparent glass close to the eye.

Alternatively, the display unit constitutes a head down monitor incorporated into the dashboard of the cockpit.

The display system is intended to facilitate piloting during landing of an aircraft on non-horizontal terrain.

BACKGROUND

Known systems simultaneously display a horizon line, a slope scale and a speed vector symbol that allow the pilot to view the slope of the aircraft easily via the relative position of the speed vector symbol with respect to the horizon line.

During the landing of aircraft, the pilot uses the displayed horizon line to position the slope of the aircraft relative to the runway. He gradually raises the speed vector symbol relative to the horizon line, during the flare phase, above the runway, so as to place the speed vector symbol below the horizon line, at a predetermined distance therefrom corresponding to a target slope, for example approximately 1° below the horizon line, before touching down with the wheels. Such a maneuver allows a comfortable touchdown of the aircraft on the runway.

SUMMARY OF THE INVENTION

Such a maneuver works well on a flat landing strip. However, in some cases, the landing strip has a slope that may reach up to +10°.

In the case where the slope of the runway is positive at the runway threshold, the gradual raising of the speed vector by the pilot may be insufficient to offset the smaller angle formed between the speed vector of the aircraft and the axis of the runway. In this case, although the pilot maintains an appropriate target slope for a flat runway, the slope of the aircraft relative to the inclined runway remains too high at the time of touchdown, due to the local rising of the runway at the touchdown point.

Consequently, the touchdown of the aircraft may be relatively hard, which is detrimental to passenger comfort.

Conversely, when the slope of the runway is negative, the flare maneuver done by the pilot no longer guarantees a sufficient slope to touch down at the desired point. The aircraft therefore touches down further on the runway, which creates a risk of go around, or even going off the runway.

One aim of the invention is therefore to provide an aircraft display system that makes it possible to obtain a comfortable touch down for passengers, at the desired point, irrespective of the topographical configuration of the landing strip.

To that end, the invention provides a system of the aforementioned type, characterized in that upon approaching a landing strip, the display-generating assembly is able to create, on the horizon line, a region that is deformed as a function of the topographical slope of the landing strip approached by the aircraft.

The system according to the invention may comprise one or more of the following features, considered alone or according to any technically possible combination:

the display-generating assembly includes an application for calculating a local deformation of the horizon line in the deformed region, as a function of a topographical slope determined from at least one piece of topographical information characteristic of the landing strip, the topographical information coming from a database or being measured;

in a first movement phase of the aircraft at a distance from the landing strip, the display-generating assembly is able to calculate the local deformation of the horizon line in the deformed region as a function of a topographical slope determined from at least one piece of topographical information from a database, in a second movement phase of the aircraft above the landing strip, the display-generating assembly is able to calculate the local deformation of the horizon line in the deformed region as a function of a topographical slope determined from a measured piece of topographical information;

the calculating application is able to query a database of landing strips, the database comprising at least one piece of topographical information corresponding to each landing strip;

the database includes, for each landing strip, a first piece of topographical information for the runway threshold altitude, a second piece of topographical information for the end-of-runway altitude, and a third piece of topographical information for the runway length, the topographical slope being calculated as a function of the first piece of topographical information, the second piece of topographical information, and the third piece of topographical information, or the database includes a topographical slope profile along the landing strip, the topographical slope being determined along the landing strip from the topographical slope profile;

the calculating application is able to recover data from a sensor measuring the slope of the airplane and a sensor measuring a height of the aircraft relative to the ground, and to calculate a topographical slope, based on data received from the sensor measuring the airplane slope and the sensor measuring the height of the aircraft relative to the ground;

the display-generating assembly is able to display, on the display unit, a speed vector symbol, indicating the slope of the aircraft on the slope scale, the width of the deformed region on the horizon line able to be displayed by the display-generating assembly being greater than the width of the speed vector symbol;

the deformed region on the horizon line, able to be displayed by the display-generating assembly, is horizontally centered on the speed vector symbol;

the deformed region on the horizon line able to be displayed by the display-generating assembly is in the form of an indentation, having a height, considered relative to the horizon line, depending on the topographical slope of the landing strip;

the deformed region on the horizon line able to be displayed by the display-generating assembly has a curved shape, in particular a bump shape, the curved shape having an apex at a height, considered relative to the horizon line, depending on the topographical slope of the landing strip;

the display-generating assembly is able to display a flare guidance symbol horizontally across from the deformed region;

when the topographical slope of the landing strip is non-null and positive, the deformed region of the horizon line created by the display generating assembly extends upward, and wherein when the topographical slope of the landing strip is non-null and negative, the deformed region of the horizon line created by the display-generating assembly extends downward;

the display unit is an at least partially transparent display unit, such as a semitransparent screen placed in front of a windshield of the cockpit, a system for projecting images on the windshield of the cockpit, a semitransparent sunshade, a helmet visor or a semitransparent glass close to the eye;

the display-generating assembly on the display unit is able to dynamically display, on the display unit, at least one horizon line, a slope scale of the aircraft relative to the horizon line and a speed vector symbol, representative of the slope of the aircraft relative to the horizon line, and the display-generating assembly is able to display, upon approaching the landing strip, a flare guidance symbol, the position of the flare guidance symbol on the display unit depending on the topographical slope of the approached landing strip;

the flare guidance symbol is able to notify the crew that a beginning of flare maneuver position has been reached, preferably a start height of the flare maneuver, the beginning of flare maneuver position being determined taking into account the topographical slope of the landing strip;

the display-generating assembly includes an application for calculating the start position of the flare maneuver, as a function of a topographical slope determined from at least one piece of topographical information from a database characteristic of the landing strip;

the display-generating assembly is able to signal reaching the beginning of flare maneuver position by placing the flare guidance symbol to coincide with the speed vector symbol;

before the beginning of flare maneuver position, the display-generating assembly is able to display the flare guidance symbol below the speed vector symbol and to bring it vertically closer to the speed vector symbol until the beginning of flare position;

the display-generating assembly is able to bring the flare guidance symbol closer to the horizon line, according to a control law representative of a vertical speed increase profile during the flare, the control law taking into account the topographical slope of the landing strip;

the control law is able to make it possible to reach a target vertical speed for the end of flare, calculated as a function of the topographical slope of the landing strip;

the display-generating assembly comprises a module for recovering data from a sensor measuring a height of the aircraft relative to the landing strip, the display-generating assembly being able to determine the topographical slope of the landing strip from data from the sensor measuring the height of the aircraft;

the actual slope of the aircraft corresponds to a target slope of the aircraft according to the control law when the flare guidance symbol coincides with the speed vector symbol;

it comprises an automatic pilot module, able to actuate the controls of the aircraft to enslave the position of the speed vector symbol to the position of the flare guidance symbol to cause the aircraft to follow an increasing vertical speed profile according to the control law.

The invention also provides a display method in an aircraft comprising the following steps:

providing a system as described above;

upon approaching a landing strip, generating and displaying, on the display unit via the display-generating assembly, a deformed region of the horizon line as a function of the topographical slope of the approached landing strip.

The method according to the invention may comprise one or more of the following features, considered alone or according to any technically possible combination:

the generating step comprises calculating a local deformation of the horizon line in the deformed region, as a function of at least one piece of topographical information characteristic of the landing strip from the database or that is measured.

it comprises the following steps:

upon approaching a given landing strip, dynamically displaying, on the display unit, via the display-generating assembly, a flare guidance symbol, the position of the flare guidance symbol depending on the slope of the approached landing strip;

the flare guidance symbol is able to notify the crew that a beginning of flare maneuver position has been reached, preferably a start height for the flare maneuver, the start position for the flare maneuver being determined by the display-generating assembly taking into account the topographical slope of the landing strip.

BRIEF SUMMARY OF THE DRAWINGS

The invention will be better understood upon reading the following description, provided solely as an example, and done in reference to the appended drawings, in which.

DETAILED DESCRIPTION

Figure 1:
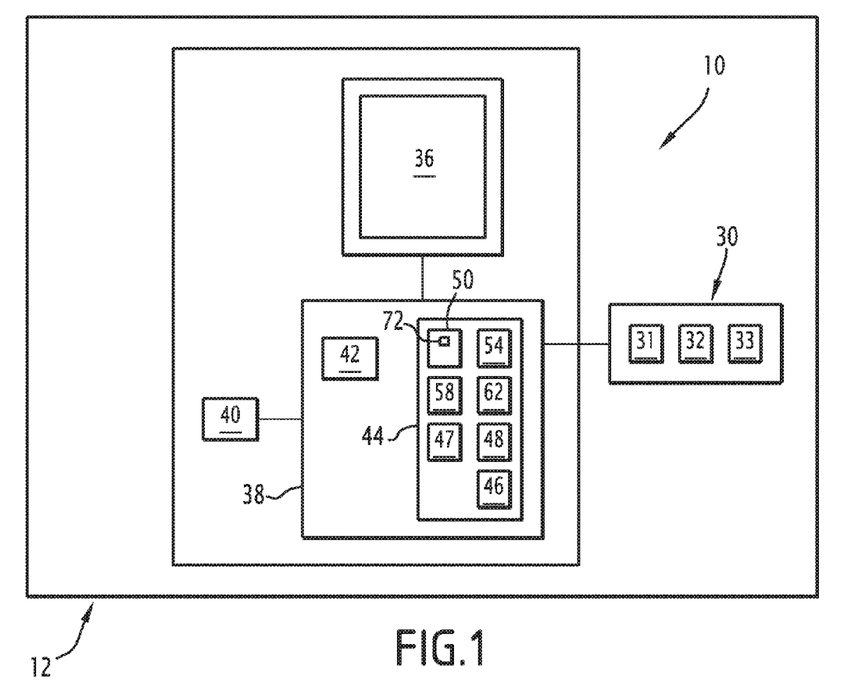
FIG. 1 is a diagrammatic view of a first display system of an aircraft according to an embodiment of the invention.
Figure 2:
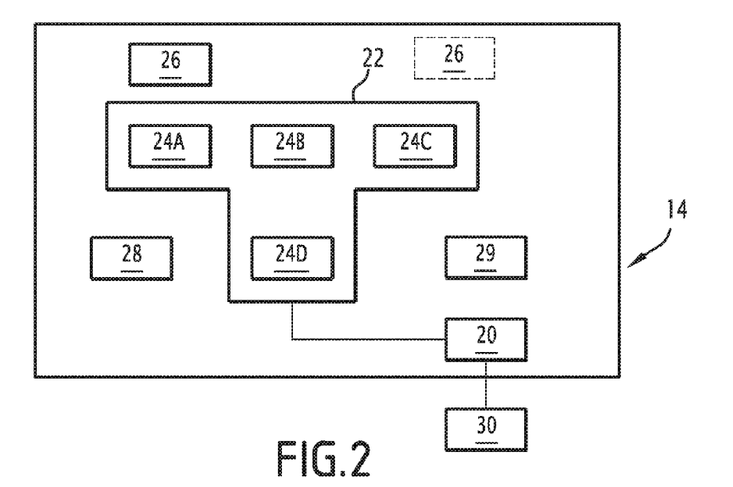
FIG. 2 diagrammatically illustrates the cockpit of an aircraft comprising the first display system.

A first display system 10 of an aircraft 12 according to an embodiment of the invention is diagrammatically illustrated by FIGS. 1 and 2.

Figure 8:
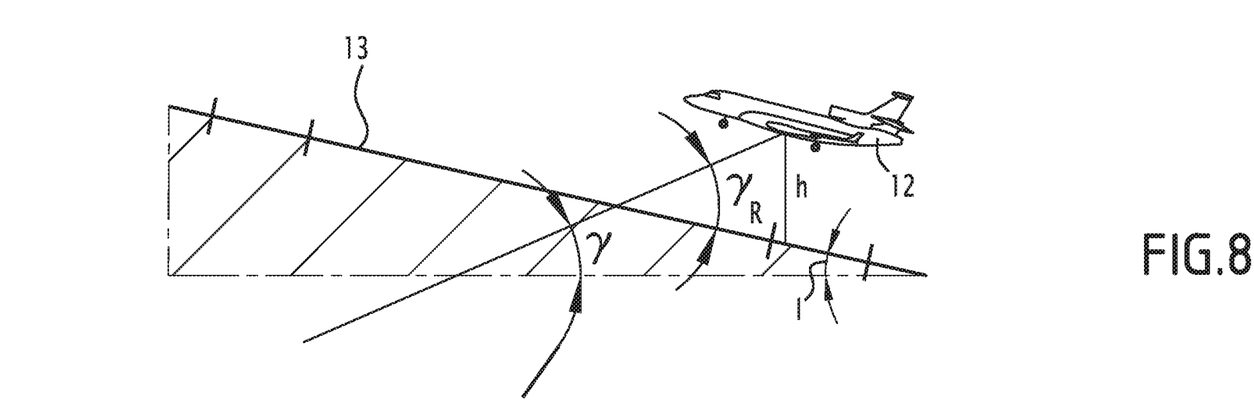
FIG. 8 is a diagrammatic side view, illustrating the apparent slope of the aircraft relative to the runway, for a runway having a positive slope.

The system 10 is intended to be installed in an aircraft 12, diagrammatically shown in FIG. 8, to allow the display of information on a display unit present in the cockpit 14 of the aircraft shown diagrammatically in FIG. 2.

The system 10 is intended to assist the pilot of the aircraft during an approach phase, near a runway 13, shown diagrammatically in FIG. 8.

In reference to FIG. 2, the cockpit 14 is provided with a primary display system 22 connected to a central avionics unit 20.

The primary system 22 allows the crew to pilot the aircraft, manage its navigation, and monitor and control the various functional systems present in the aircraft. The system 22 includes a dashboard provided with a plurality of base monitors 24A to 24D forming head down monitors.

In this example, the cockpit 14 is also advantageously provided with at least one head up semitransparent monitor 26, placed across from the windshield, or even two semitransparent head up monitors 26.

The cockpit 14 is further provided with a control member 28 for the piloting of the aircraft, such as a lever or a control stick.

It advantageously includes an automatic pilot system 29 able to be activated by the crew.

In a known manner, the base monitors 24A and 24C are for example primary display monitors intended to display flight parameters of the aircraft. The base monitors 24B and 24D are for example multifunctional navigation and/or monitoring and control monitors for avionics systems.

The primary display system 22 is provided with a display management assembly (not shown) able to display the different windows present on these monitors 24A to 24D.

The central avionics unit 20 is connected to a system 30 of measuring sensors for measuring airplane parameters of the aircraft 12.

The measuring sensor system 30 for example includes sensors for measuring parameters outside the aircraft such as the temperature, pressure or speed, sensors for measuring parameters internal to the aircraft and its various functional systems, and position sensors, such as geographical position sensors 31, in particular a GPS sensor, sensors 32 for determining the slope of the aircraft, in particular at least one inertial unit, and a sensor 33 for determining a height relative to the ground, in particular a radio altimeter.

The sensors of the system 30 are able to provide information on the geographical position of the aircraft 12, its speed, its heading and its altitude (pitch attitude, roll angle).

In reference to FIG. 1, the display system 10 is connected to the measuring sensor system 30.

The display system 10 includes at least one display unit 36, and a display generator in the form of a display-generating assembly 38 on the display unit 36, connected to the display unit 36 and to the system of measuring sensors 30. The system 10 further includes a man/machine interface 40.

The display unit 36 is for example one of the monitors 24A to 24B and/or is the head up semitransparent monitor 26 of the cockpit 14. In other alternatives, the display unit 36 is for example a system or projector for projecting images on the windshield of the cockpit, a semitransparent sunshade, a helmet visor or a semitransparent glass close to the eye.

In a first embodiment, which will be described below, the display unit 36 of the display system 10 is the head up semitransparent monitor 26 of the cockpit 14.

The display-generating assembly 38 includes at least one processor 42 and at least one memory 44 containing a plurality of software modules able to be executed by the processor 42. It includes a database 46 of landing strip characteristics, for example stored in the memory 44.

The display-generating a simply 38 includes a module 48 for recovering data from the measuring sensors of the system 30, in particular a sensor 32 for measuring the slope of the aircraft 12, and the sensor 33 for measuring the height of the aircraft 12 relative to the ground.

The display-generating assembly 38 further includes a module 47 for generating a model symbol 49 of the aircraft, a module 50 generating an artificial horizon line 52, and an associated module 54 for generating a slope scale 56.

Figure 5:
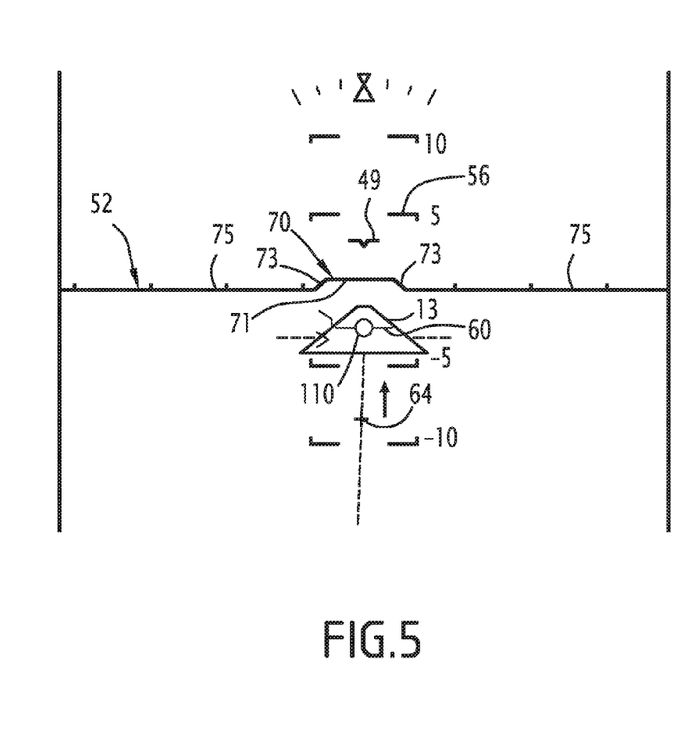
Figure 6:
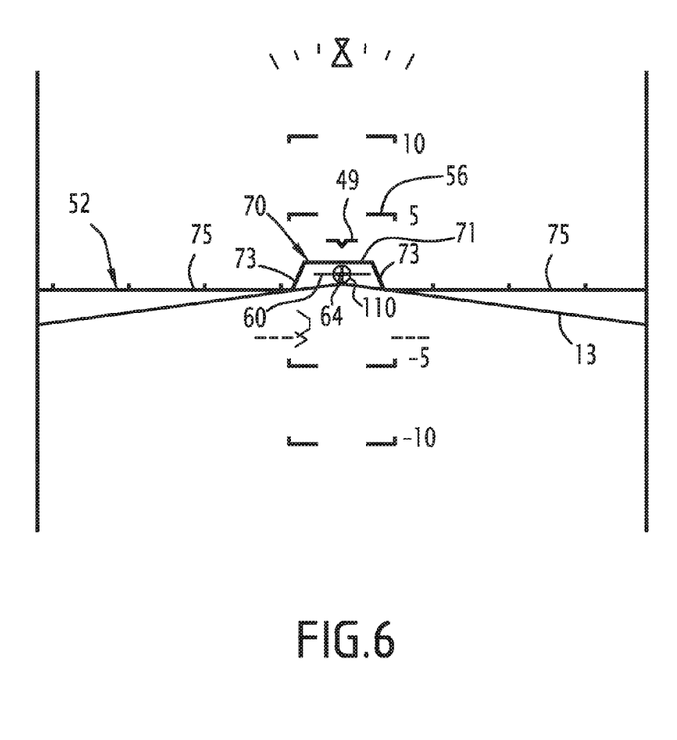
Figure 7:
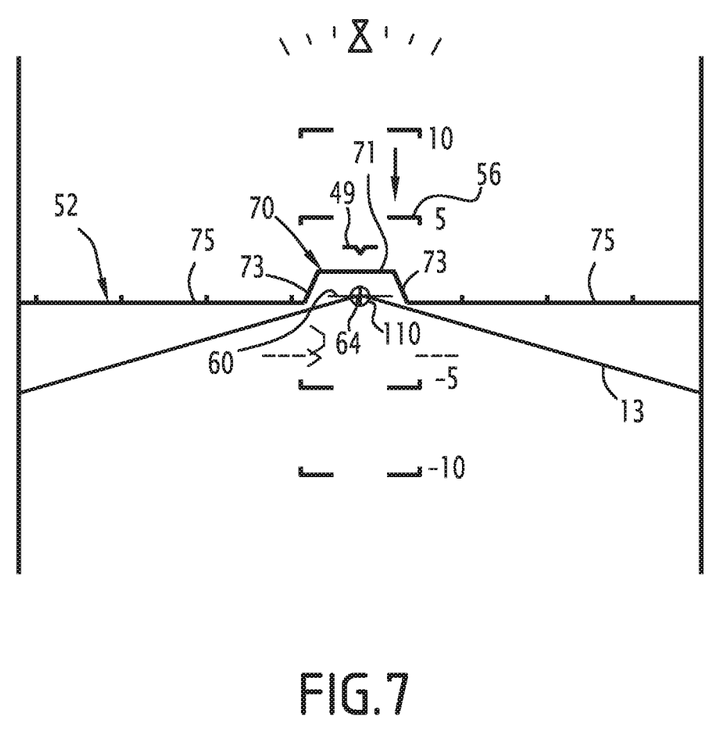

The display-generating assembly 39 also comprises a module 58 for generating a speed vector symbol 60, and a module 62 for generating a flare guidance symbol 64, shown in FIGS. 5 to 7.

The display-generating assembly 38 further includes modules (not shown) for generating other symbols representative of flight parameters, for example in altitude indicator, an airspeed indicator, a vertical speed indicator, a ground speed indicator, an engine information indicator, and a suspension configuration indicator of the aircraft.

The generating module 47 is able to create the display of an airplane model symbol 49 that embodies an infinite projection of the longitudinal axis of the aircraft 12, from data received from the sensors of the measuring sensor system 30.

The generating module 50 is able to determine, from data received from the sensors of the measuring sensor system 30, the position of an artificial horizon line 52 relative to the current attitude of the aircraft. This horizon line 52 is straight when the aircraft 12 moves with wings level, and tilts as a function of the tilt angle of the aircraft 12.

In at least one approach phase of the aircraft 12 toward the landing strip 13, the module 50 is able to create, on the horizon line 52, a deformed region 70 as a function of the topographical slope of the landing strip 13.

Figure 4:
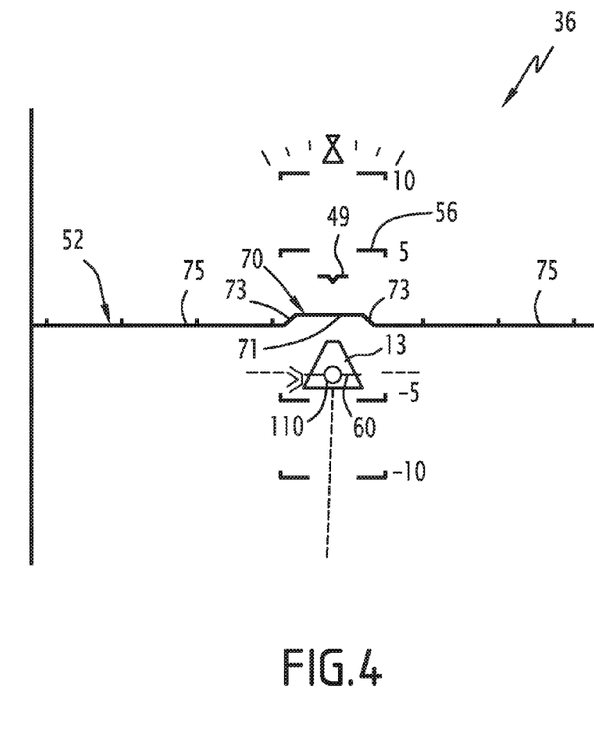

In the example illustrated in FIG. 4, the deformed region 70 is a region of the horizon line 52 centered on the speed vector symbol 60. It has an indentation shape with a segment 71 parallel to the rest 75 of the horizon line 52, and two connecting segments 73 that are inclined or perpendicular relative to the rest 75 of the horizon line 52.

Figure 11:
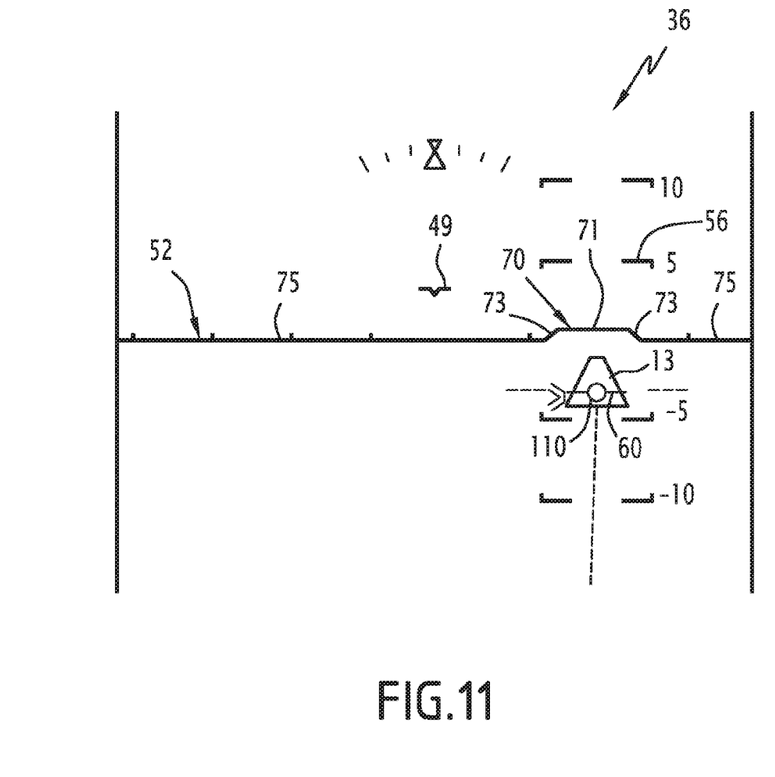
FIG. 11 is a view similar to FIG. 4, during movement with a cross-wind.
Figure 12:
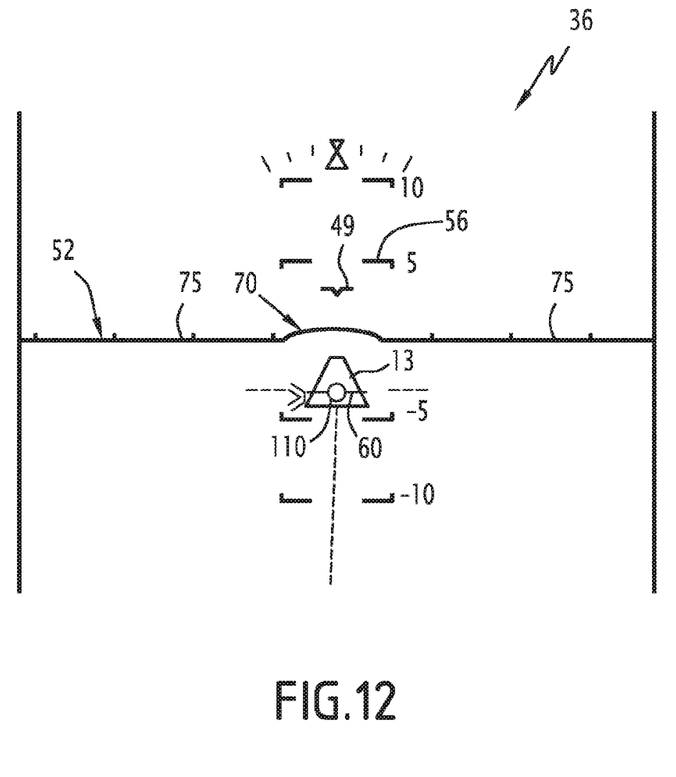
FIG. 12 is a view similar to FIG. 4, illustrating the display by a system according to an alternative embodiment of the invention.

In an alternative illustrated by FIG. 11, the deformed region 70 has a curved shape, for example a bump shape. The curved shape has an apex at a height, considered relative to the rest 75 of the horizon line 52, depending on the topographical slope of the landing strip 13.

The deformed region 70 extends upward when the topographical slope of the landing strip 13 is positive. It extends downward when the topographical slope of the landing strip 13 is negative.

In reference to FIG. 1, the generating module 50 includes a calculator in the form of a software application 72 for calculating a local deformation of the horizon line 52 in the deformed region 70, as a function of the topographical slope of the landing strip 13.

"Topographical slope" refers to the actual slope of the landing strip 13 on the terrain.

The deformation of the deformed region 70 is characterized here by its maximum height, considered vertically relative to the rest of the horizon line 52.

The calculating application 72 is able to recover at least one piece of topographical information characteristic of the runway 13, from a database or that is measured, and to calculate the deformation of the deformed region 70 as a function of the piece(s) of characteristic topographical information.

Advantageously, in the first movement phase of the aircraft 12 axially at a distance from the landing strip 13, the calculating software application 72 is able to recover at least one piece of topographical information from the database of landing strips 46, then to calculate the local deformation of the horizon line 52 in the deformed region 70 as a function of the or each piece of topographical information from a database.

The piece of topographical information from a database is for example the altitude at a given point of the runway and/or the length of the runway. The database 46 for example includes, for each runway 13, the altitude of the runway threshold, the altitude of the end of the runway and the length of the runway.

The calculating software application 72 is then able to calculate an estimated slope of the runway 13 based on the altitude of the runway threshold, the altitude of the end of the runway and the length of the runway.

In one alternative, topographical information from a database contained in the database 46 is directly the topographical slope in the touchdown zone around the target touchdown point.

In a second movement phase of the aircraft 12 above the landing strip 13, the calculating software application 72 is able to continuously calculate a piece of measured characteristic topographical information of the runway 13, as a function of the data from the sensors 31, 33 for measuring the airplane slope and the height of the aircraft relative to the ground recovered by the data recovery module 48.

Figure 10:
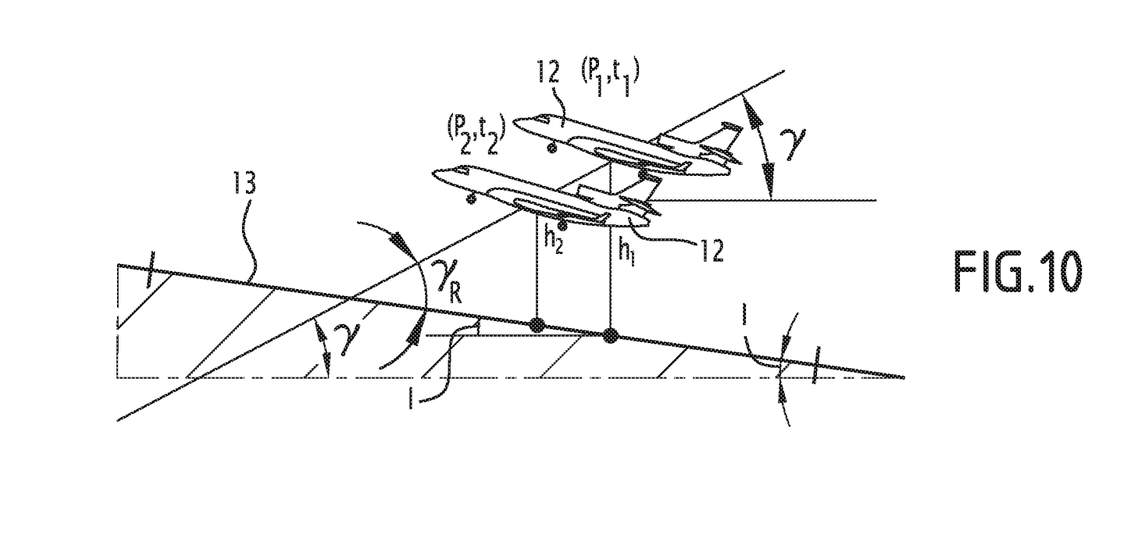
FIG. 10 is a diagrammatic side view, illustrating two successive points of the trajectory of the aircraft relative to a runway with a positive slope.

In reference to FIG. 10, this piece of topographical information is a calculated slope I and is determined to be delivered from measurements collected at two successive points P1, P2 of the aircraft's trajectory 12 at successive passage times t1, t2, and in particular heights h1, h2 measured at the points P1, P2, of the airplane slope measured between the points P1 and P2, and the horizontal speed VH of the aircraft 12.

The local topographical slope I of the runway is for example estimated by the following equations:

$$\Delta = \arctan[(h2-h1)/(VH \times (t2-t1))] \quad (1)$$

$$I = \gamma - \Delta \quad (2).$$

The maximum height of the deformed region 70 is then calculated by the calculating application 72 to correspond to the value of the topographical slope, from a database or measured, of the landing strip 13, taken on the slope scale 56 created by the module 54.

For example, if the topographical slope, from a database or measured, is N degrees, the maximum height of the deformed region 70 relative to the rest 75 of the horizon line 52 is N degrees on the slope scale 56 created by the module 54.

In the first movement phase of the aircraft 12 at a distance from the landing strip 13, the height of the deformed region 70 remains constant. In a second movement phase of the aircraft 12, above the landing strip 13, the height of the deformed region 70 evolves continuously as a function of the local topographical slope of the runway 13 below the aircraft 12 measured using sensors of the system 30.

In this example, the deformed region 70 created by the module 50 is centered relative to the slope scale 56, and relative to the speed vector symbol 60.

The deformed region 70 here has a width larger than that of the speed vector symbol 60, and preferably, larger than that of the end of the landing strip 13.

The width of the deformed region 70 nevertheless preferably remains smaller than 80%, advantageously smaller than 50% of the total width of the horizon line 52.

The width of the deformed region 70 is for example greater than that of the speed vector symbol 60, and less than two times the width of the speed vector symbol 60.

The width of the landing strip 13 is obtained from the database 46.

The deformed region 70 is therefore localized. It follows the lateral movement of the speed vector symbol 60 as illustrated by FIG. 11, during a crosswind movement.

The generating module 54 is able to create a slope scale 56 centered horizontally on the rest 75 of the horizon line 52, away from the deformed region 70. The slope scale 56 is for example graduated in slope degrees relative to the artificial horizon line 52, taken at a distance from the deformed region 70.

The generating module 58 is able to create the display of a speed vector symbol 60 indicating the direction of the speed vector of the aircraft 12, based on data received from the sensors of the system 30. The vertical separation between the artificial horizon line 52, at a distance from the deformed region 70, represents the ground slope γ of the aircraft, as illustrated in FIG. 8, considered relative to a non-inclined ground.

Figure 9:
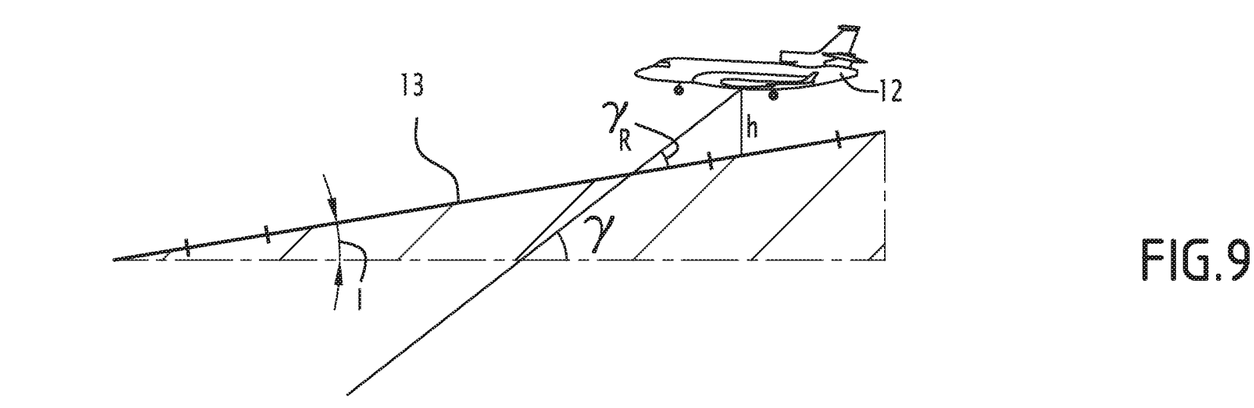
FIG. 9 is a view similar to FIG. 8, for a runway with a negative slope.

The vertical separation between the deformed region 70 and the speed vector symbol 60 then represents the visible ground slope $\gamma_R$ of the aircraft 12 relative to the landing strip 13, taking into account the topographical slope I of the landing strip 13 (see FIG. 8 or 9).

The generating module 62 is able to create the display of the flare guidance symbol 64, at the end of approach toward the landing strip 13.

It is able to display the flare guidance symbol 64 to notify the crew that a beginning of flare maneuver position has been reached, preferably of a flare maneuver beginning height. The beginning position of the flare maneuver is determined taking into account the topographical slope I of the landing strip 13.

The beginning of flare maneuver position is determined by the generating module 62 as a function of a piece of topographical slope information coming from a database for the landing strip 13, determined using the database of landing strips 46, via a calculating application 72 as described above, either using the threshold and end of runway altitudes and the runway length contained in the database 46, or directly using a slope contained in the database 46.

The beginning of flare maneuver position is determined also taking into account the measured airplane slope γ.

Advantageously, the generating module 62 includes a database of beginning of flare maneuver heights, as a function of the airplane slope γ measured by the sensor 32 and the topographical slope I of the landing strip 13, as determined by the calculating application 72, in particular as a function of the apparent slope $y_R$ calculated from the airplane slope γ and the topographical slope I.

The generating module 62 is able to signal that the beginning of flare maneuver height has been reached by placing the flare guidance symbol 64 in register with the speed vector symbol 60. Preferably, to indicate that the aircraft 12 has reached the beginning of flare height, the flare guidance symbol 64 is positioned at the same horizontal level as the speed vector symbol 60, horizontally coinciding with the latter, preferably in a receiving zone 110 of the speed vector symbol 60 embodied here by a circle defining the desired slope of the aircraft.

To allow the pilot to anticipate reaching the beginning of flare maneuver position, the generating module 62 is advantageously able to display the flare guidance symbol 64 below the speed vector symbol 60 before reaching the beginning of flare maneuver position and to bring it vertically closer to the speed vector symbol 60 so as to reach the speed vector symbol 60 at the beginning of flare maneuver position.

Once the beginning of flare maneuver position has been reached, the generating module 62 is able to bring the flare guidance symbol 64 closer to the horizon line 52 according to a control law representative of an increase profile for the vertical speed during flare.

The control law for example connects, for each apparent slope $\gamma_R$ of the aircraft 12 relative to the landing strip 13, a height relative to the landing strip 13 with a target vertical speed. The control law makes it possible to go from a first beginning of flare vertical speed, when the aircraft 12 reaches the beginning of flare maneuver height, to a second target end of flare vertical speed greater than the first vertical speed when the aircraft reaches the end of flare before the wheels touch down. It accounts for the topographical slope of the landing strip 13.

Preferably, the second target end of flare vertical speed, which applies to the end of flare, is calculated as a function of the topographical slope of the landing strip 13.

The generating module 62 is able to determine, at each moment, the second target vertical speed as a function of the topographical slope of the landing strip 13. The topographical slope is initially estimated using topographical information from a database as described above, then is obtained by calculation using height data and slope data respectively measured using sensors 33 and 32, as indicated above.

According to the control law, the flare guidance symbol 64 is moved relative to the horizon line 52, while translating, in the form of a slope on the airplane slope scale 56, the target vertical speed, obtained at the measured height at each moment, by the sensor 32.

Then, once the end of flare is reached, the generating module 62 is able to keep the flare guidance symbol 64 at a constant distance from the horizon line 52, corresponding to the desired target vertical speed value at the end of flare, allowing an appropriate touch down of the aircraft 12 on the landing strip 13.

The operation of the display system 10, upon the approach toward a landing strip 13, will now be described in reference to FIGS. 3 to 7.

Figure 3:
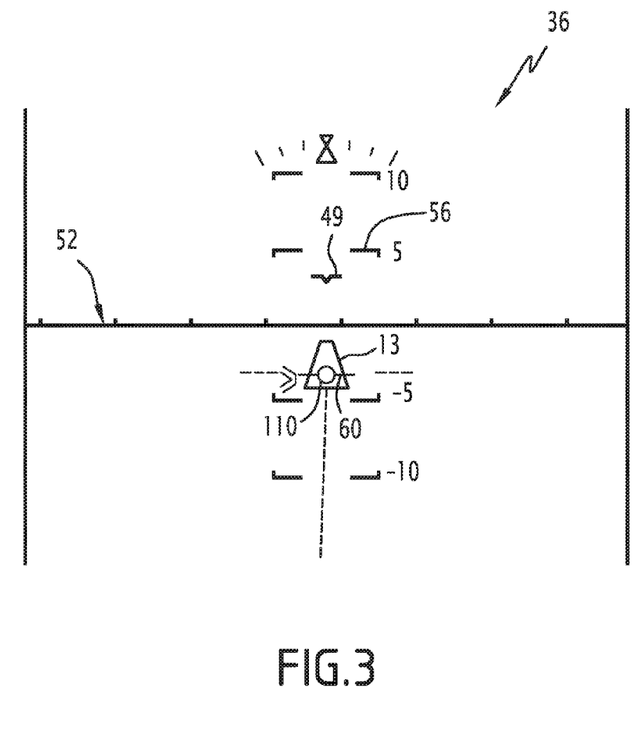
FIGS. 3 to 7 illustrate the display created by the display system when the aircraft is approaching a landing strip.

Initially, the aircraft 12 descends toward the landing strip 13. As illustrated by FIG. 3, the generating module 50 keeps the horizon line 52 in a non-deformed configuration, with no deformed region 70.

The generating module 54 creates the display of a slope scale 56 and the generating module 58 creates the display of speed vector symbol 60 whereof the vertical distance from the horizon line 52 reflects the airplane slope, on the slope scale 56.

Then, at a given distance from the landing strip 13, the crew selects the targeted landing strip 13. The calculating application 72 recovers topographical information in the runway database 46.

The topographical information recovered from a database for example includes the altitude at the runway threshold, the altitude at the end of the runway and the length of the runway.

Based on topographical information recovered from the database 46, the calculating software application 72 calculates a topographical slope from a database of the landing strip 13.

Based on the topographical slope from a database, the calculating application 72 determines the maximum height of the deformed region 70 relative to the rest 75 of the horizon line 52 and displays the deformed region 70 as illustrated in FIG. 4.

During this first evolution phase, the height of the deformed region 70 relative to the rest of the horizon line 52 is constant.

The height of the deformed region 70 is representative of the topographical slope from a database of the landing strip 13. The deformed region 70 extends upward if the topographical slope is positive, and downward if the topographical slope is negative.

The width of the deformed region 70 is slightly larger than that of the speed vector symbol 60, as indicated above. The deformed region 70 remains centered on the speed vector symbol 60.

When the aircraft 12 reaches the landing strip 13, or from a given altitude above the landing strip 13, the sensor 33 measures, at each moment, the height of the aircraft 12 relative to the landing strip 13. The airplane slope is also measured continuously by the sensor 32.

Based on this measured height and the airplane slope, the local topographical slope I of the runway visible in FIG. 8 is then estimated by the calculating software application 72 using equations (1) and (2) above.

The maximum height of the deformed region 70 is then calculated at each moment by the calculating module 72 to correspond to the value of the measured topographical slope of the landing strip on the slope scale 56 created by the generating module 54.

Thus, by viewing the deformed region, the pilot simply anticipates that the landing strip 13 is not horizontal and attempts his flare as a function of the actual topographical slope of the landing strip 13, the value of which comes from tables in the first movement phase, and the value of which is measured in the second movement phase.

In the case of the landing strip 13 having a positive topographical slope, this prevents the pilot from not increasing the vertical speed enough, which could lead to a hard landing.

On the contrary, the pilot can stay at a given distance from the deformed region 70 of the horizon line 52 that corresponds to the apparent slope $\gamma_R$ of the aircraft 12 relative to the landing strip 13.

In the case of a negative topographical slope of the landing strip 13, this prevents the pilot from increasing the vertical speed excessively, which would cause a long landing and risk go around the runway. The safety of the landing is therefore increased.

The display of a deformed region 70 on the artificial horizon line 52 does not modify the visual references of the pilot, unlike a shift of the entire artificial horizon line 52 based on the slope of the runway.

For the pilot to perform the flare, he guides his speed vector relative to the deformed region 70 as he does for a non-deformed horizon line on a flat runway. In particular, the pilot advantageously places the speed vector symbol 60 below the deformed region 70 and gradually raises the speed vector symbol 60 relative to the deformed region 70 in order to place the symbol 60 at a predetermined distance from the deformed region corresponding to an end of flare target slope (for example approximately 1° below the deformed region 70 of the horizon line).

The pilot can therefore anticipate the maneuver as on a flat runway, without losing references, whether he pilots directly or monitors the actions of an automatic pilot system.

Furthermore, as illustrated by FIG. 5, to allow the pilot to anticipate reaching the beginning of flare maneuver position, the generating module 62 is advantageously able to display the flare guidance symbol 64, here in the form of a cross, below the speed vector symbol 60 before the beginning of flare maneuver position and bring it vertically closer to the speed vector symbol 60 until the beginning of flare maneuver position.

The beginning of flare position is then determined by the generating module 62 as a function of a piece of topographical slope information from a database of the landing strip 13, determined using the database of landing strips 46, by the calculating application 72 as described above.

The beginning of flare maneuver position is further determined taking into account the airplane slope γ measured by the sensor 32.

In reference to FIG. 6, the generating module 62 next signals that the beginning of flare maneuver position has been reached by placing the flare guidance symbol 64 horizontally in register with the speed vector symbol 60.

At the beginning of flare maneuver height, the flare guidance symbol 64 is positioned at the same horizontal level as the speed vector symbol 60, horizontally coinciding with the speed vector symbol 64, preferably in the receiving zone 110 of the speed vector symbol embodied here by a circle defining the desired slope of the aircraft.

Next, the generating module 62 commands the approach of the flare guidance symbol 64 toward the horizon line 52.

The approach follows the predetermined control law, corresponding to a vertical speed variation as a function of the measured height relative to the landing strip 13, to go from a first target vertical speed at the beginning of flare maneuver position to a second target vertical speed greater than the first target vertical speed at the end of flare.

The generating module 62 determines, at each moment, the second target vertical speed as a function of the topographical slope of the landing strip 13. The topographical slope is initially estimated using topographical information from a database, then is measured from data received from the sensors 32 and 33, as indicated above.

At each moment, the generating module 64 receives a height datum measured using the sensor 33, and determines the vertical distance separating the flare guidance symbol 64 from the horizon line 52 based on the control law.

The flare guidance symbol 64 therefore comes gradually closer to the horizon line 52, clearly indicating to the pilot that the flare must be done, and proposing a flare strategy to the pilot on which he must match the speed vector symbol 60.

The pilot or the automatic pilot system 29 may then adopt the proposed flare strategy by horizontally aligning the speed vector symbol 60 with the flare guidance symbol 64.

Once the end of flare is achieved, the generating module 62 keeps a flare guidance symbol 64 at a second constant distance from the horizon line 52.

The presence of a flare guidance symbol 64 helps the pilot determine the appropriate moment to initiate flare, which simplifies this task at the end of landing.

This moment is not only determined as a function of the measured airplane slope, but also as a function of a topographical slope of the landing strip 13, to account for the apparent slope between the aircraft 12 and the landing strip 13.

The vertical movement of this symbol 64 is also useful to determine a desired vertical speed profile during flare.

In one alternative, the flare guidance symbol 64 is displayed only when the data from the sensors of the system 30 is used to determine the measured slope of the runway 13.

The flare guidance symbol 64 is then moved at each moment as a function of the control law, as described above.

In the embodiments of invention described above, the topographical slope of the landing strip being taken into account as of the beginning of flare, this makes it possible to implement a flare maneuver with dynamic continuity and avoids a sharp increase in the command to pull up in case of a positive slope.

In one alternative, the database 46 contains a topographical slope profile along the landing strip 13, defining, for each point of the runway, a piece of topographical slope information from a database.

The generating module 50 is able to calculate the height of the deformed region as a function of the topographical slope information from a database corresponding to each point of the landing strip 13, when the aircraft 12 moves above the landing strip 13. In one alternative, the generating module 50 is able to keep the horizon line 52 without a deformed region 70 as long as measured topographical slope information is not obtained reliably from the system of measuring sensors 30.

In another alternative, the display-generating assembly 38 is able to create a deformed region 70 on the horizon line 52, without necessarily creating the display of a flare guidance symbol 64.

What is claimed is:

1. A display system of an aircraft, comprising:
    a display unit; and
    a display generator for generating a display on the display unit, configured to dynamically display, on the display unit, at least one horizon line and a slope scale of a slope relative to the horizon line, upon approaching a landing strip the display generator being configured to create, on the horizon line, a region that is deformed as a function of a topographical slope of the landing strip approached by the aircraft.

2. The system according to claim 1 wherein the display generator includes a calculator for calculating a local deformation of the horizon line in the deformed region, as a function of a topographical slope determined from at least one piece of topographical information characteristic of the landing strip, the topographical information coming from a database or being measured.

3. The system according to claim 2 wherein, in a first movement phase of the aircraft at a distance from the landing strip, the display generator is configured to calculate the local deformation of the horizon line in the deformed region as a function of a topographical slope determined from at least one piece of topographical information from a database, and wherein, in a second movement phase of the aircraft above the landing strip, the display generator is configured to calculate the local deformation of the horizon line in the deformed region as a function of a topographical slope determined from a measured piece of topographical information.

4. The system according to claim 2 wherein the calculator is configured to query a database of landing strips, the database comprising at least one piece of topographical information corresponding to each landing strip.

5. The system according to claim 4 wherein the database includes, for each landing strip, a first piece of topographical information for a runway threshold altitude, a second piece of topographical information for an end-of-runway altitude, and a third piece of topographical information for a runway length, the topographical slope being calculated as a function of the first piece of topographical information, the second piece of topographical information and the third piece of topographical information, or wherein the database includes a topographical slope profile along the landing strip, the topographical slope being determined along the landing strip from the topographical slope profile.

6. The system according to claim 2 wherein the calculator is configured to recover data from a sensor measuring the slope of the airplane and a sensor measuring a height of the aircraft relative to the ground, and to calculate the topographical slope, based on data received from the sensor measuring the airplane slope and the sensor measuring the height of the aircraft relative to the ground.

7. The system according to claim 1 wherein the display generator is configured to display, on the display unit, a speed vector symbol, indicating the slope of the aircraft on the slope scale, a width of the deformed region on the horizon line configured to be displayed by the display generator being greater than the width of the speed vector symbol.

8. The system according to claim 7 wherein the deformed region on the horizon line, configured to be displayed by the display generator, is horizontally centered on the speed vector symbol.

9. The system according to claim 1 wherein the deformed region on the horizon line configured to be displayed by the display generator is in the form of an indentation, having a height, considered relative to the horizon line, depending on the topographical slope of the landing strip.

10. The system according to claim 1 wherein the deformed region on the horizon line configured to be displayed by the display generator has a curved shape, the curved shape having an apex at a height, considered relative to the horizon line, depending on the topographical slope of the landing strip.

11. The system according to claim 10 wherein the curved shape is a bump shape.

12. The system according to claim 1 wherein the display generator is configured to display a flare guidance symbol horizontally across from the deformed region.

13. The system according to claim 1 wherein, when the topographical slope of the landing strip is non-null and positive, the deformed region of the horizon line created by the display generator extends upward, and wherein when the topographical slope of the landing strip is non-null and negative, the deformed region of the horizon line created by the display generator extends downward.

14. The system according to claim 1 wherein the display unit is an at least partially transparent display unit, such as a semitransparent screen placed in front of a windshield of the cockpit, a projector for projecting images on the windshield of the cockpit, a semitransparent sunshade, a helmet visor or a semitransparent glass close to the eye.

15. The system according to claim 14 wherein the at least partially transparent display unit is a semitransparent screen placed in front of a windshield of the cockpit.

16. A display method in an aircraft comprising:
providing the system according to claim 1; and
upon approaching the landing strip, generating and displaying, on the display unit via the display generator, the deformed region of the horizon line as a function of the topographical slope of the approached landing strip.

17. The method according to claim 16 wherein the generating and displaying of the deformed region comprises calculating a local deformation of the horizon line in the deformed region, as a function of at least one piece of topographical information characteristic of the landing strip from a database or that is measured.

* * * * *